Patented Aug. 1, 1950 2,516,837

UNITED STATES PATENT OFFICE 2,516,837

PROCESS OF REGENERATING AN AQUEOUS ALKALI SOLUTION

John Happel, Brooklyn, and Stephen P. Cauley, Jackson Heights, N. Y., assignors to Socony-Vacuum Oil Company, Incorporated, a corporation of New York No Drawing. Application June 11, 1943,
Serial No. 490,491

7 Claims. (Cl. 23—184)

This application is a continuation-in-part of our co-pending application Serial Number 463,688, filed October 28, 1942, for Sweetening Hydrocarbons, now abandoned.

This invention is directed to the treatment of hydrocarbon oils for the reduction of the mercaptan sulfur content thereof, particularly intended to provide a finished gasoline fraction which is either "sweet" to the "doctor" test or is sufficiently low in sulfur to be acceptable under specifications wherein the doctor test is not used and total sulfur content is determined.

Stated in another way, the invention is directed to the treatment of a hydrocarbon mixture containing mercaptans to effect a substantial removal of mercaptan or mercaptan sulphur from the mixture.

In treating hydrocarbons, such as straight run gasoline, natural gasoline, cracked gasoline and the like, to render them sweet to the "doctor" test, the objective is to remove materials of the nature of hydrogen sulfide, mercaptans or the like or to convert them to innocuous compounds. Washing with aqueous solutions of strong alkalies, such as caustic soda will remove most of the hydrogen sulfide and some, but not all, of the mercaptans. Washing with aqueous caustic to which some material has been added as a "solutizer," or solubility promoter, enables the caustic to dissolve and remove more or all of the mercaptans. Butylene glycols, butyric acids, and phenolic material are so used. Older methods make use of sodium plumbite formed by dissolving litharge in caustic soda, the effect here being to convert mercaptans to mercaptides and later to disulfides, which are innocuous to the doctor test, by addition of free sulfur.

In general, all processes of this kind leave something to be desired, and this field, one of the oldest in petroleum refining, is still the subject of active research.

This invention has for its object the provision of a method for treatment of light petroleum hydrocarbons of the nature of gasoline, natural gasoline, cracked gasoline, kerosenes, solvents and the like, capable of effecting very considerable reductions in the mercaptan sulfur content of the material so treated and particularly capable of providing a process of this general kind in which the reagent useful for the removal of mercaptan sulfur may be regenerated cheaply, effectively and with certainty.

This invention is based upon the discovery that if small percentages of tannin or of other poly hydroxy benzene derivatives hereinafter defined be added to a caustic solution which has been utilized or is to be utilized as a reagent for the removal of mercaptan sulfur and similar acidic materials, that the mercaptans may be readily removed and the spent caustic solution may be regenerated for re-use by blowing with air or other oxidizing gas.

It is known that caustic soda solution is a competent reagent for the removal of mercaptans of low molecular weight and as such it finds a position as a most useful treating agent for gasoline fractions from various sources containing such bodies. While this same reagent is less efficient in the removal of higher mercaptans, it is capable, when used in sufficient quantities, of effecting such removal. More usually the caustic solution is re-enforced in its ability to remove the higher mercaptans by the addition of materials spoken of in the art as "solutizers" because they increase the mercaptan removal power of the caustic. Many materials, including glycols, such as butylene glycol, monocarboxylic acids such as butyric acid, and phenolic materials, such as cresol are so used as solutizers.

In all cases, however, it has been found necessary to regenerate the caustic solutions by steaming to remove mercaptans. The relative cost of this procedure increases sharply as the mercaptan sulfur concentration of the treating solution decreases. High regeneration costs of steaming therefore limit the flexibility of treating processes, in that more elaborate mercaptan removal equipment must be used in conjunction with regeneration by steaming than would be required with a more efficient method of regeneration.

It has been found that when certain poly hydroxy benzene carboxylic acids and related compounds, of which group the preferred member is tannic acid, are present in small amounts in the caustic solution, whether with or without solutizers, that a ready, effective and cheap regeneration can be conducted, under certain conditions hereinafter defined, by a simple process of blowing with air or other oxidizing gases at atmospheric temperature.

The process herein proposed then is one wherein a gasoline or other light hydrocarbon fraction containing mercaptan sulfur is contacted in an oxygen free contacting system of the type usual in the industry with a caustic alkali reagent of the type normally used for removal of mercaptan sulfur and the spent reagent therefrom, with added tannin or related substances is externally regenerated by blowing or contacting the mercaptan rich reagent with oxygen or oxygen containing gases.

As an example of the kind of operation which may be obtained under these conditions, the following experimental data is given:

A caustic-tannin solution of 10% NaOH 1% tannin (C. P.) which has been blown with air was used to treat a full range cracked gasoline. The treating was conducted in an atmosphere of nitrogen to avoid internal regeneration and samples of gasoline were withdrawn at one minute intervals and analyzed for mercaptan sulfur. The data obtained are shown below.

| Sample | Mercaptan Sulfur Content, Wt. Per cent |
|---|---|
| Raw Gasoline | 0.0142 |
| Gasoline after 1 minute contacting | 0.0078 |
| Gasoline after 2 minutes contacting | 0.0064 |
| Gasoline after 3 minutes contacting | 0.0058 |
| Gasoline after 4 minutes contacting | 0.0055 |

At this point the treating solution was withdrawn and blown with air for several minutes for regeneration. The treating solution was then returned to the treating flask and contacted as before. The following results were noted.

| Sample | Mercaptan Sulfur Content, Wt. Per cent |
|---|---|
| Gasoline from previous contacting | 0.0055 |
| Gasoline after 1 minute contacting | 0.0036 |
| Gasoline after 2 minutes contacting | 0.0033 |
| Gasoline after 3 minutes contacting | 0.0028 |
| Gasoline after 4 minutes contacting | 0.0025 |

The caustic solution may be either sodium hydroxide or potassium hydroxide and it will usually be a solution of a concentration between about 10% caustic and 45% caustic. From the standpoint of efficiency, potassium hydroxide is to be preferred. However, cost relationships will probably more usually indicate sodium hydroxide as the alkali to be used. The concentration of tannin or other catalytic agent in the treating solution may vary. It has been found that from 1% to 3% by weight appears to be the most effective concentration, although concentrations as low as 0.1% may be used. On the upper end, concentrations higher than 5.0% appear at present to yield diminishing returns. The treating solution may be contacted with the petroleum fraction to be treated in any conventional treating system, such as in a packed tower or any system providing countercurrently arranged contacting stages. The amount of solution to be used may be varied to the individual treating requirements, but in general, will be from 1–50% by volume of the petroleum fraction being treated. The treating temperature may vary. For practical operation, a temperature of 75–100° F. is recommended. Since this is quite a usual atmospheric temperature or readily attainable around an oil refinery, this phase of the operation presents no difficulties.

Certain other points are of interest in connection with this operation. First, the concentration of the catalytic material has an influence upon the rate of regeneration of the reagent. This influence is shown by the data in Table I following, which data is derived from laboratory experiments designed to eliminate certain process variables, but is highly reflective of actual commercial operating data.

The procedure used in this case was as follows. A treating solution was carefully prepared consisting of 5 N NaOH and 1 N para-cresol containing 1% of mercaptan sulfur, and the catalyst added to this solution after the mercaptans. The solution is shaken with air in a separatory funnel for one minute, the ratio of air to solution being 6 to 1. The air is then replaced by flushing with low pressure air for ten seconds and the procedure repeated. The rate of fall of mercaptan concentration is a measure of the activity of the catalyst. The following table gives a number of results obtained by this procedure:

TABLE I

*Mercaptan sulfur regeneration rates, percent/min., 1 N Na p-cresylate solutions containing n-butyl mercaptan*

| Constituent Conc., Per cent | Gallic Acid | Tannin |
|---|---|---|
| 0 | 0.003 | 0.003 |
| 0.25 | 0.074 | 0.077 |
| 0.50 | 0.118 | 0.085 |
| 1.00 | 0.122 | 0.136 |

A further point of interest in connection with the regeneration is that this regeneration must not be conducted to a point of complete conversion of mercaptides to disulfides since somewhat before this point is reached, oxidation of the catalytic material itself occurs depriving it of further effectiveness. In general, however, the amount of residual mercaptan sulfur which must be allowed to remain is quite low, as indicated by Table II following. The data here presented is again derived from laboratory experiments which is quite parallel with commercial operation.

The procedure used in conducting these tests was as follows: A solution containing five gram moles/liter of free NaOH, one gram mole of sodium cresylate, and a given concentration of oxidation catalyst is prepared for testing. A concentration of n-butyl mercaptan greater than necessary for stabilization is then added to the solution. The solution is then alternately regenerated by air blowing and refortified with mercaptan for a total of seven such operations. The degree of regeneration is controlled so that the deviation in mercaptan concentration is approximately 0.2% by weight during each cycle. At the end of seven cycles the solution is analyzed for its catalyst content. If no appreciable reduction in catalyst concentration is obtained during the above operation the process is repeated using the same solution but at a lower mercaptan concentration. Whenever the catalyst content is found to have been appreciably reduced by this procedure it is evident that the mercaptan concentration present was not sufficient for catalyst stabilization. Results are given in the following table:

TABLE II

*Limits of RSH conc. for protection of oxidation catalysts*

[n-Butyl mercaptan used]

| Material | Catalyst Conc., Wt. Per cent | S(RSH) Conc., Wt. Per cent |
|---|---|---|
| Gallic Acid | 0.5 | 0.20 |
| Do | 1.0 | 0.25 |
| Do | 1.5 | 0.30 |
| Tannin | 0.5 | 0.25 |
| Do | 1.0 | 0.25 |
| Do | 1.5 | 0.25 |

From this it will be observed that a relatively small amount of residual sulfur amounting to not over about 0.3% by weight, calculated as mercaptan, of the caustic solution, is amply sufficient to protect the reagent.

This process has several very material advantages. Of major importance, the sulfur is actually removed from the oil, and not merely converted to the disulfide form. This is of importance since while disulfide sulfur is relatively non-corrosive and not objectionable from the standpoint of odor, it exercises a highly deleterious effect upon the lead susceptibility of the gasoline in which it is contained and consequently modern processing requires the removal rather than the conversion of sulfur. Another major feature is that the oxidation regeneration, instead of being a steaming regeneration may be accomplished by blowing with relatively low pressure air at ordinary temperatures, thus effecting a major reduction in cost. Of interest also is the fact that while steaming regenerations must be conducted in regenerative equipment of the nature of a fractionating tower of considerable height, the regeneration here spoken of may be conducted in relatively simple equipment. Of further interest is the fact that the degree of regeneration attained is such that the caustic solution may be of relatively low concentration and low viscosity and still operate at quite high removal efficiencies, thus completely doing away with prior difficulties having to do with entrained gasoline, emulsions, difficulty of separating hydrocarbons from reagent, both during treating and during regeneration, encountered in those previous processes which required the use of reagents of high concentration.

The catalytic reagents utilized herein are of particular interest.

In general, we have found the poly hydroxy benzene carboxylic acids and certain of their derivatives to be useful for this purpose. Such acids as the dihydroxybenzoic acids, including proto-catechuic acid and the resorcyclic acids, and the trihydroxybenzoic acids such as gallic acid and its related compounds and derivatives are found useful. However, a particular preference is had for those compounds known as tannin or tannic acid. The term tannic acid or tannin is understood to cover those substances generally so grouped. Most of them are substances widely distributed in the vegetable kingdom. They are soluble in water, possess an acid, astringent taste, are colored dark blue or green by ferrous salts, precipitate gelatin, and form leather when applied to animal hides. The constitution of many tannic acids is still somewhat obscure. Some appear to be glucosides of gallic acid, and decompose into gallic acid and sugar upon boiling with dilute acids. Others contain phloroglucin. Upon fusing with KOH these mostly form protocatechuic acid and phloroglucin. Among the tannic acid compounds there may be named gallotannic acid, digallic acid, gallyl-gallic acid and the various tannin materials derived from oak-bark, quinine-bark, coffee, moringa-tannin, cutch, chestnut, logwood, sumac, and many other natural sources. Many such compositions appear to contain compounds of the nature of polyhydroxyflavpinacols, yielding, upon fusion with alkali, poly hydroxy benzenes such as phloroglucin, resorcinol, or pyrogallol, and poly hydroxy benzene carboxylic acids such as proto-catechuic or gallic acids. All such compounds are considered to be equivalent and embraced by the term tannic acid as herein used.

A wide variety of vegetable tannins have been investigated in connection with this process, the results of this work are shown in Table III, in the developing of which the same experimental procedure as for the results shown in Table I was used.

TABLE III

*Summary of tannin evaluations*

Air to Solution Ratio=6:1
Mercaptan—$nC_4H_9SH$
Temp.—80° F.
Solution—5N NaOH+1N Na Cresylate
Tannin Concentration—1%

| Tannin Material | Average Regeneration Slope, Per Cent S(SH) regen./min. |
|---|---|
| Chestnut, 1% | 0.19 |
| Wattle | 0.18 |
| Quercitron | 0.09 |
| Quebracho (C. W. Ext.) | 0.10 |
| Tara | 0.16 |
| Osage Orange | 0.05 |
| Logwood #4 | 0.14 |
| Ulmo | 0.13 |
| Quebracho (H. W. Ext.) | 0.11 |
| Spruce | 0.08 |
| Oak | 0.15 |
| Sumac | 0.18 |
| Cutch | 0.10 |
| Gambier | 0.09 |

It is apparent that all of these materials may be applied in the process and give regeneration at useful rates, although the materials vary among themselves in efficiency.

It will be noted that all of the compounds herein suggested as oxidation catalysts are embraced within the class of poly hydroxy benzene carboxylic acids and derivatives thereof; within this class it is preferred to use tannic acid as hereinabove defined.

We claim:

1. The process of regenerating an aqueous alkali solution containing weakly acidic sulphur compounds and a small amount of an oxidation promoter which catalytically promotes the oxidation of said weakly acidic sulphur compounds, and which itself is capable of air oxidation, substantially consisting of a polyhydroxy benzene carboxylic acid having more than two hydroxy groups and capable of oxidation to a quinone form, which solution has been used to extract said weakly acidic sulphur compounds from hydrocarbon fluids, comprising: contacting said solution with an oxygen-containing gas in such manner as to oxidize said sulphur compounds but to leave sufficient amount of unoxidized sulphur compounds in said solution to substantially reduce oxidized promoter that may be formed to the original catalytic form and removing the oxidized sulphur compounds from solution.

2. The process of regenerating an aqueous alkali solution containing weakly acidic sulphur compounds and a small amount of an oxidation promoter which catalytically promotes the oxidation of said weakly acidic sulphur compounds, and which itself is capable of air oxidation, substantially consisting of a tannin, which solution has been used to extract said weakly acidic sulphur compounds from hydrocarbon fluids, comprising: contacting said solution with an oxygen-containing gas in such manner as to oxidize said sulphur compounds but to leave sufficient amount of unoxidized sulphur compounds in said solution to substantially reduce oxidized tannin that may be formed to the original catalytic form and removing the oxidized sulphur compounds from solution.

3. The process of regenerating an aqueous alkali solution containing weakly acidic sulphur compounds and a small amount of an oxidation promoter which catalytically promotes the oxidation of said weakly acidic sulphur compounds, and which itself is capable of air oxidation, substantially consisting of gallic acid, which solution has been used to extract said weakly acidic sulphur compounds from hydrocarbon fluids, comprising: contacting said solution with an oxygen-containing gas in such manner as to oxidize said sulphur compounds but to leave sufficient amount of unoxidized sulphur compounds in said solution to substantially reduce oxidized gallic acid that may be formed to the original catalytic form and removing the oxidized sulphur compounds from solution.

4. The process of regenerating an aqueous alkali solution containing weakly acidic sulfur compounds and a small amount of an oxidation promoter which accelerates the rate of oxidation of said weakly acidic sulfur compounds in the presence of oxygen and which itself is deactivated by air in the absence of a minimum concentration of said weakly acidic sulfur compounds, substantially consisting of a tannin, which solution has been used to extract said weakly acidic sulfur compounds from hydrocarbon fluids, comprising: contacting said solution with an oxygen-containing oxidizing gas until a substantial portion of said weakly acidic sulfur compounds is oxidized but at least about 0.1 per cent of unoxidized weakly acidic sulfur compounds and sufficient to maintain the activity of said tannin remains in said solution, and removing the oxidized sulfur compounds from the solution.

5. The process of regenerating an aqueous alkali solution containing weakly acidic sulfur compounds and a small amount of an oxidation promoter which accelerates the rate of oxidation of said weakly acidic sulfur compounds in the presence of oxygen and which itself is deactivated by air in the absence of a minimum concentration of said weakly acidic sulfur compounds, substantially consisting of gallic acid, which solution has been used to extract said weakly acidic sulfur compounds from hydrocarbon fluids, comprising: contacting said solution with an oxygen-containing oxidizing gas until a substantial portion of said weakly acidic sulfur compounds is oxidized but at least about 0.1 per cent of unoxidized weakly acidic sulfur compounds and sufficient to maintain the acitivity of said gallic acid remains in said solution, and removing the oxidized sulfur compounds from the solution.

6. The process of regenerating an aqueous alkali solution containing weakly acidic sulfur compounds and a small but effective amount of an oxidation promoter selected from the group consisting of gallic acid, tannic acid and tannins, which promoter accelerates the rate of oxidation of said weakly acidic sulfur compounds in the presence of oxygen, said solution having been used to extract said weakly acidic sulfur compounds from hydrocarbon fluids, comprising: contacting said solution with an oxygen-containing oxidizing gas until a substantial portion of said weakly acidic sulfur compounds is oxidized but at least about 0.1 per cent of unoxidized weakly acidic sulfur compounds remains in said solution, and removing the oxidized sulfur compounds from the solution.

7. The process of regenerating an aqueous alkali solution containing weakly acidic sulfur compounds and a small but effective amount of an oxidation promoter selected from the group consisting of gallic acid, tannic acid and tannins, which accelerates the rate of oxidation of said weakly acidic sulfur compounds in the presence of oxygen, said solution having been used to extract said weakly acidic sulfur compounds from hydrocarbon fluids, comprising: contacting said solution with an oxygen-containing oxidizing gas until a substantial portion of said weakly acidic sulfur compounds is oxidized but about 0.2 to about 0.3 per cent of unoxidized weakly acidic sulfur compounds remains in said solution, and removing the oxidized sulfur compounds from the solution.

JOHN HAPPEL.
STEPHEN P. CAULEY.

REFERENCES CITED

The following references are of record in the file of this patent:

UNITED STATES PATENTS

| Number | Name | Date |
|---|---|---|
| 1,855,353 | Jacobson | Apr. 26, 1932 |
| 1,943,744 | Rosenstein | Jan. 16, 1934 |
| 2,015,038 | Pevere | Sept. 17, 1935 |
| 2,297,621 | Henderson | Sept. 29, 1942 |
| 2,315,530 | Loyd | Apr. 6, 1943 |
| 2,316,092 | Loyd | Apr. 6, 1943 |
| 2,317,054 | Henderson et al. | Apr. 20, 1943 |
| 2,341,917 | Henderson et al. | Feb. 15, 1944 |
| 2,341,918 | Henderson et al. | Feb. 15, 1944 |
| 2,369,771 | Bond | Feb. 20, 1945 |

FOREIGN PATENTS

| Number | Country | Date |
|---|---|---|
| 126,544 | Hungary | Mar. 17, 1941 |